United States Patent [19]
Prueter

[11] 3,788,435
[45] Jan. 29, 1974

[54] AUTOMATIC HUB FOR FOUR WHEEL DRIVE VEHICLES AND THE LIKE

[75] Inventor: Clarence M. Prueter, Cedar Rapids, Iowa

[73] Assignee: Cutlas Gear & Mfg., Inc., Vinton, Iowa

[22] Filed: Mar. 13, 1972

[21] Appl. No.: 233,928

[52] U.S. Cl.................... 192/35, 192/44, 192/47, 192/114 R
[51] Int. Cl............................................ F16d 41/08
[58] Field of Search ........ 192/35, 36, 44, 47, 114 R

[56] References Cited
UNITED STATES PATENTS

| | | | |
|---|---|---|---|
| 3,656,597 | 4/1972 | Gruchmann | 192/35 |
| 3,491,864 | 1/1970 | Niu | 192/35 X |
| 3,123,169 | 3/1964 | Young et al. | 192/36 UX |
| 1,937,211 | 11/1933 | Vondra | 192/35 X |
| 2,289,019 | 7/1942 | Jessen | 192/44 X |
| 2,884,101 | 4/1959 | Warn | 192/44 |
| 3,055,471 | 9/1962 | Warn et al. | 192/35 UX |
| 3,344,686 | 10/1967 | Baker | 192/35 X |
| 3,437,186 | 4/1969 | Roper | 192/35 |
| 3,472,349 | 10/1969 | Ainsworth | 192/35 |

FOREIGN PATENTS OR APPLICATIONS

| | | | |
|---|---|---|---|
| 1,188,087 | 3/1959 | France | 192/44 |

*Primary Examiner*—Allan D. Herrmann
*Attorney, Agent, or Firm*—Haven E. Simmons et al.

[57] ABSTRACT

An automatic hub for each of the optionally driven wheels of a vehicle employs an annular brake shoe, axially spring loaded, to retard rotation of a sprag carrier relative to a pair of inner and outer clutch members, between which the sprag carrier operates, in order to cause the sprags to lock the wheels to their axles only when the latter are positively driven in either direction. The hub additionally incorporates a separate assembly which causes the sprags to lock the wheels to their axles on the overrun as well as when the axles are driven.

4 Claims, 4 Drawing Figures

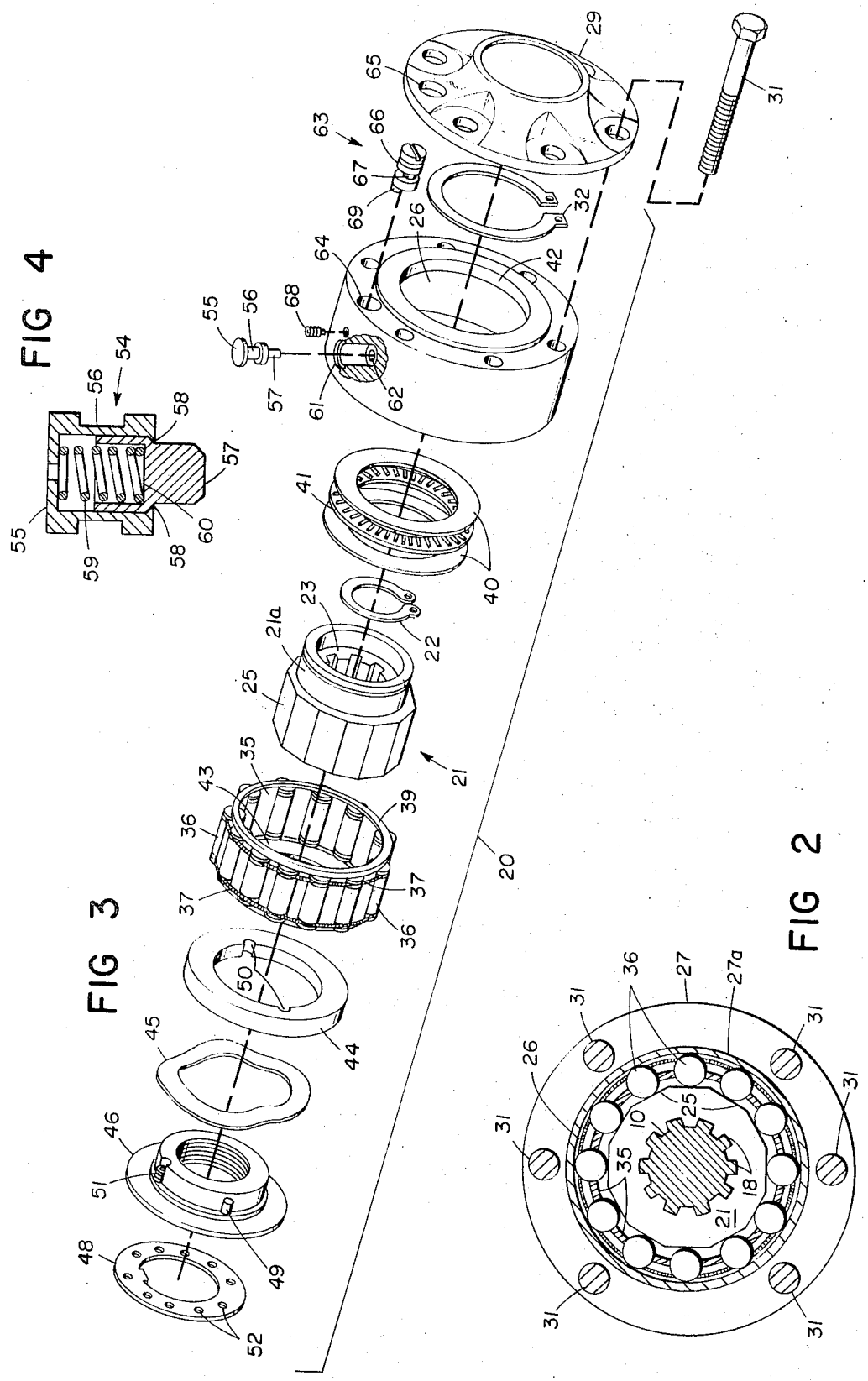

3,788,435

AUTOMATIC HUB FOR FOUR WHEEL DRIVE VEHICLES AND THE LIKE

BACKGROUND OF THE INVENTION

Automatic hubs for the optionally driven wheels, generally the front wheels of a four-wheel drive vehicle, do not require the driver manually to set and then reset the hub before he can engage and disengage the drive to the front wheels. Instead, in the usual case, the front wheels are automatically locked to their axles whenever torque is positively applied to them by the engine. When that torque ceases, as when on the overrun or when the drive to the front wheels is disengaged, the front wheels are automatically unlocked from their axles. In this lies their distinction from the manual type hub which requires the driver to dismount from the vehicle and adjust the hub each time he wishes to lock or unlock the wheels and their axles.

One form of automatic hub, which has been commercially used, is shown and described in U.S. Pat. No. 3,055,471. Essentially, that hub uses an inner annular clutch member splined to the axle whose outer surface is polygonal in shape to provide a set of ramps, and an outer annular clutch member fixed to the wheel whose inner surface is cylindrical. Between the two surfaces of the clutch members is an annular cage carrying a set of roller shaped sprags. Rotation of the inner clutch member relative the cage or sprag carrier, by torque applied to the axle, causes the ramps of the former to urge the sprags into engagement with the outer clutch member, thus locking the axle to the wheel. Except when the inner clutch member is so rotated relative to the sprag carrier, the sprags remain free of engagement with the outer clutch member and hence the wheel is free to rotate relative to its axle in either direction.

In order to cause rotation of the inner clutch member relative to the sprag carrier, the latter is braked or retarded whenever the inner clutch member is positively driven by the axle. In the patent concerned, this is accomplished by an axially extending sleeve on the sprag carrier which is fitted with a set of brake shoes peripherally about the sleeve. The shoes bear radially inwardly against an annulus on the stationary axle housing which projects into the sleeve. Thus whenever the axle is driven, the shoes retard the sprag carrier and cause the sprags to lock the axle to the wheel. Experience has shown, however, that these brake shoes tend to wear quite rapidly and so reduce the retardation of the sprag carrier, eventually to the point where the hub will no longer function to lock the axle to the wheel, whereupon the hub must be dismantled and the shoes replaced. This has often occured in intervals as little as 10,000 to 20,000 miles of four-wheel driving. Hence, the primary object of the present invention is to provide an automatic hub of the general type referred to having a much greater life before repair or replacement is needed.

SUMMARY OF THE INVENTION

The present invention employs a different method of braking the sprag carrier. Instead of the radially acting brake shoes of the patent referred to, a single annular brake shoe is employed having a relatively broad end face which is resiliently urged axially into engagement with a similar end face provided on the sprag carrier by a Belleville or wafer type spring acting between the shoe and a portion of the stationary axle housing. A much greater braking area is thereby obtained, and as a result the wear problem is dramatically reduced, whatever wear there is on the brake shoe being compensated for by the wafer spring. The latter occupies a minimum of space, unlike a coil spring of equivalent strength, and need not be compressed any significant distance before its operating pressure is obtained. In use, even 50,000 miles of four-wheel driving have not produced any disablement owing to wear. Furthermore, the single annular brake shoe and spring assembly is cheaper and simpler than several radial shoes as well as being much more easily serviced or replaced. Other and further features and advantages of the present invention will become apparent from the more detailed description which follows.

BRIEF DESCRIPTION OF THE DRAWINGS

FIG. 2 is a section taken along the line 2—2 of FIG. 1.

FIG. 3 is an exploded isometric view of the hub of FIG. 1.

FIG. 4 is a detailed section illustrating the lockup plunger incorporated in the hub of FIGS. 1 and 3.

DESCRIPTION OF THE PREFERRED EMBODIMENT

Figure 1:
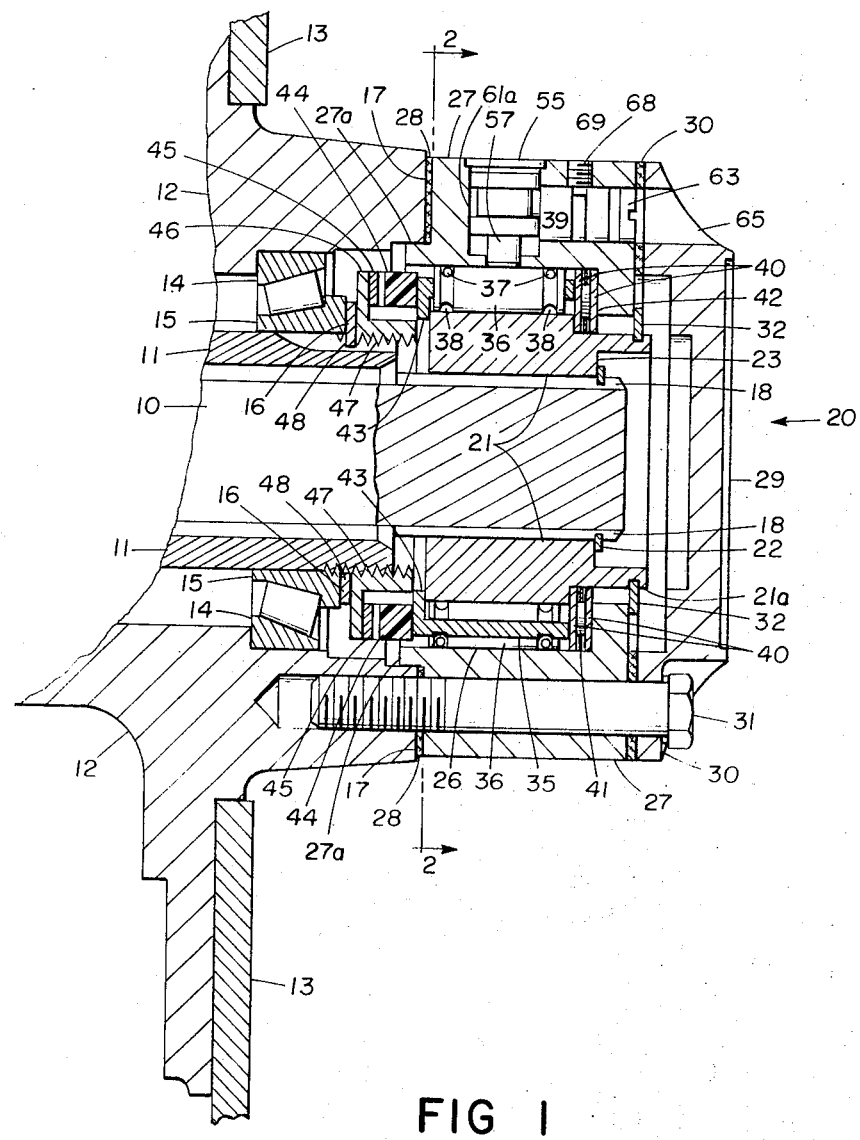
FIG. 1 is a partial section through an automatic hub and wheel of a vehicle employing the present invention.

As shown in FIG. 1, an optionally driven axle 10 is spacedly enveloped by its stationary housing 11 and the latter in turn by an inner hub 12 to which is affixed the disc of the wheel 13 in conventional manner. The hub 12 is supported for rotation on the housing 11 by two sets of roller bearings 14 (only one being illustrated), the inner race 15 of the outer set having an outer axial face 16 somewhat inboard of an outer axial face 17 of the hub 12. The axle 10 extends beyond the hub face 17 and is provided with splines 18 at its outer end.

The automatic hub assembly, generally indicated at 20 (see FIG. 3), includes an annular inner clutch member 21 splined on the end of the axle 10, being spaced somewhat outboard from the outer end of the housing 11 and provided with an outer sleeved extension 21a. The clutch member 21 is secured on the axle 10 against outboard movement by a snap ring 22 fitting in a groove about the outer end of the axle 10, the snap ring 22 bearing against a shoulder 23 formed together with the sleeved extension 21a. The outer peripheral surface of the clutch member 21 (see FIG. 2) is polygonally shaped to provide a series of uniform ramps 25 which are spacedly encompassed in turn by the inner cylindrical clutch surface 26 of an outer annular clutch member 27. The inner axial end of the clutch member 27 is faced to bear against the hub face 17 through the medium of a sealing gasket 28, being located concentrically with respect thereto by an integral axial lip 27a extending into a counterbore in the outer end of the hub 17. The outer axial end of the clutch member 27 is faced to receive an end cap 29, between which is a second sealing gasket 30, just outboard of the sleeved extension 21a. The clutch member 27 and end cap 29 are secured to the hub 12 by means of cap screws 31 through the former two and threaded into the hub 12. The inner clutch member 21 is secured against inboard movement on the axle 10 by a second snap ring 32 concentrically within the gasket 30 and fitting in a groove about the end of the sleeved extension 21a, the snap ring 32 bearing against the outer end face of the clutch member 27 and the end cap 29 being dished to provide the necessary clearance.

Between the inner and outer clutch members 21 and 27 is disposed the sprag carrier 35, generally in the shape of a thin sleeve, whose periphery is formed with rectangular apertures to receive the roller sprags 36, one for each ramp 25. The sprags 36 lie along the ramps 25 with their axes parallel to the axis of the inner clutch member 21. Normally the sprags 36 are disposed centrally between the respective apices of the ramps 25 and are biased to this position by a pair of coil spring bands 37 respectively circumventing the ends of the sprags 36, being retained in grooves 38 about the two ends of each sprag 36. In this position, the sprags 36 just clear the surrounding clutch surface 26 of the outer clutch member 27 so that the latter, together with the hub 12 and wheel 13, can rotate on the bearings 14 relative to the axle 10, housing 11, the inner clutch member 21 and the sprag carrier 35. The outer end of the sprag carrier 35 is provided with a faced rim 39 which bears against a pair of thrust washers 40 between which is sandwiched a roller bearing thrust washer 41, the outer washer 40 in turn bearing against an inner shoulder 42 formed together with the clutch surface 26 at its outer axial end. The inner axial end of the sprag carrier 35 is provided with a wider faced rim 43 against which bears one end face of a rigid annular brake shoe 44, of suitable material, such as NYLA TRON 52-5 nylon (HI-PV nylon 6/6 bearing formulation) whose other end face is engaged by a Belleville or wafer spring 45. The latter is compressed against the brake shoe 44 by the flange 46 of a sleeve nut 47, spacedly encompassed by the brake shoe 44, threaded on the axle housing 11 and turned up against a washer 48 keyed to the axle housing 10 and abutting the face 16 of the bearing race 15. The brake shoe 44 is fixed against rotation relative to the sleeve nut 47, and thus also relative to the sprag carrier 35, by means of a pair of locating dowels 49 extending through the flange 46 and engaging notches 50 in the inner periphery of the shoe 44. Inadvertent loosening of the sleeve nut 47 in turn is prevented by a set screw 51 threaded through the flange 46 in the opposite direction which engages one of a number of locating holes 52 in the key washer 48. The sprag carrier 35 is thus axially located by the pressure on the brake shoe 44 acting against the thrust washer 40 and 41 and the shoulder 42, it being understood of course, that the spring 45 and the distance between the brake shoe 44 and the flange 46 are both properly sized for the spring 45 to be operative.

Accordingly, when the axle 10 is not positively driven in either direction, the sprags 36, owing to the influence of the spring bands 37, remain centrally along their respective ramps 25 and out of engagement with the clutch surface 26 of the outer clutch member 27. The latter and the hub 12 and wheel 13 are thus free to rotate relative to the axle 10, inner clutch member 21 and sprag carrier 35 which are stationary, rotation of the shoulder 42 of the clutch member 27 relative to the rim 39 of the sprag carrier 35 being accommodated by the roller bearing thrust washer 41 so that there is no drag or wear on the sprag carrier 35 itself. When, on the other hand, the axle 10 is positively driven in either direction, consequent rotation of the inner clutch member 21 causes the latter to turn relative to the sprag carrier 35 owing to the restraining action on the carrier rim 39 of the brake shoe 44, whereupon the ramps 25 urge the sprags 36 outwardly into engagement with the clutch surface 26 and thus lock the axle 10 to the wheel 13. During the overrun, of course, the axle 10 is not positively driven relative to the wheels 13, but rather the latter tends to try to "drive" the outer clutch member 27 relative to the axle 10 and the inner clutch member 21, thus keeping the sprags 36 at the centers of their ramps 25 and permitting free wheeling in either direction.

In order to lock the axle 10 to the wheel 13 in all circumstances, including the overrun so as to provide engine braking, a locking plunger assembly 54 (see FIG. 4) is incorporated in the outer clutch member 27. The plunger 54 consists of a hollow cylindrical outer body 55 closed at one end with a peripheral groove 56 about its waist. Within the body 55 is a bayonet pin 57 which is axially slidable relative to the body 55 and retained therewithin by cooperating annular shoulders 58 formed at the other end of the body 55 and about the waist of the pin 57. The latter normally projects axially from the latter end of the body 55 and is resiliently maintained in this position by a coil spring 59 in a counterbore 60 in the pin 57 operating against the closed end of the body 55. The plunger 54 fits slidably in a radially aligned well 61 opening through the periphery of the outer clutch member 27 between two of the cap screws 31, a smaller bore 62 for the pin 57 being provided in the bottom of the well 61 and opening through the clutch surface 26 for engagement and disengagement of the sprag carrier 35 by the pin 57. The plunger 54 is slidably operated in the well 61 by a cylindrical plug 63 in a bore 64 from the outboard face of the clutch member 27 to and intersecting the well 61. The outer end of the plug 63 is slotted for manipulation by a screw driver and accessible through a bore 65 in the end cap 29. The waist of the plug 63 is grooved to receive an O-ring 66 which frictionally engages the bore 64 and serves to retain the plug 63 in whatever position it is adjusted. Between the O-ring 66 and the inner end of the plug 63 is another groove 67 which receives the inner end of a set screw 68 threaded through the periphery of the clutch member 27 adjacent and outboard of the well 61, the set screw 68 serving to retain the plug 63 in its bore 64. The inner end of the plug 63 is provided with an eccentric nose 69 which engages the groove 56 of the plunger 54, the nose 60 acting against the shoulders of the groove 56 to move the plunger 54 slidably in its well 61 toward and away from the sprag carrier 35.

When the plug 63 is turned to move the plunger 54 radially inwards its maximum extent, the nose of the pin 57 contacts the sprag carrier 35 between a pair of the sprags 36, thus preventing rotation of the carrier 35 relative to the outer clutch member 27. Since on the overrun the outer clutch member 27 will then tend to rotate the sprag carrier 35 relative to the inner clutch members 21 and the axle 10, the ramps 25 will thus urge the sprags 36 into engagement with the clutch surface 26 and so lock the axle 10 to the wheel 13 no matter in which direction it is being driven. When on the other hand the axle 10 is driven, the plunger 54 takes over the role of the brake shoe 44 and retards the sprag carrier 35 relative to the inner clutch member 21 driven by the axle 10. Thus the plunger 54 acts to lock up the axle 10 and the wheel 13 not only when the axle 10 is driven but also when the wheel 13 is driven on the overrun. The spring 59 between the plunger body 55 and the bayonet pin 57 takes care of the situation in which a sprag 36 happens to be beneath the pin 57 when the plunger 54 is moved inwards. In that case, the spring 59 compresses to allow the plunger body 55 nevertheless to be moved inwards its full extent. Then when the clutch member 27 and sprag carrier 35 are moved slightly, the pin 57 rides off the sprag 36 and snaps down on the carrier 35.

Though the invention has been described in terms of a particular embodiment, being the best mode known of carrying out the invention, it is not limited to that embodiment alone. Instead the following claims are to be read as encompassing all adaptations and modifications of the invention falling within its scope and spirit.

I claim:

1. In an automatic hub of the type described for a vehicle, the hub including an inner generally annular clutch member adapted for driven rotation by an optionally driven axle of the vehicle carried in an adjacent non-rotating portion of the vehicle's suspension and an outer generally annular clutch member concentric with the inner clutch member and adapted for attachment to a wheel of the vehicle, the outer clutch member having an inner cylindrical clutching surface formed integrally therewith concentric with the two clutch members and spacedly encompassing the periphery of an outer clutching surface formed integrally with the inner clutch member, a plurality of clutch means between the inner and outer clutching surfaces spaced peripherally about the outer clutching surface, means biasing the clutch means into engagement with the outer clutching surface but out of engagement with the inner clutching surface whereby the clutch means are driven about the axis of the inner clutch member only during driven rotation of the inner clutch member by the axle, brake means for the clutch means effective to restrain rotation of the clutch means relative to the inner clutch member upon driven rotation of the inner clutch member by the axle, the outer clutching surface having a plurality of portions formed integrally therewith, said portions and the brake means together being effective to urge the clutch means radially outwards against the biasing means into engagement with the inner clutching surface and to maintain said engagement upon and throughout driven rotation of the inner clutch member by the axle at a rotational speed greater than that of the outer member, the improvement in which the brake means comprises a brake member having a relatively extensive axially facing annular friction surface, the brake member being adapted to be operatively associated with the non-rotating portion of the vehicle's suspension so as to be restrained against rotation relative to the inner clutch member, the clutch means having a relatively extensive axially facing braking surface in continuous engagement with the friction surface of the brake member, and means resiliently urging the braking and friction surfaces into engagement with each other.

2. The hub of claim 1 wherein the clutch means are disposed in and carried by an annular carrier member between the inner and outer clutch members and move conjointly therewith, the brake member being generally annular with its friction surface engaging an axial end face of the carrier member, said end face constituting the braking surface of the clutch means.

3. The hub of claim 2 wherein the outer clutching surface portions comprise a plurality of plane surfaces extending axially of the inner clutch member and forming a regular polygon in cross-section, wherein the inner clutching surface is cylindrical in shape, and wherein the clutch means comprise a plurality of cylindrical rollers disposed on respective ones of the outer clutching surfaces axially parallel to the axis of the inner clutch member, the resilient means comprising a wafer-type annular spring operatively disposed between the brake member and the non-rotating portion of the vehicle's suspension.

4. The hub of claim 3 including lock means disposed in the outer clutch member and optionally manually movable therein through the inner clutching surface to engage and restrain rotation of the carrier member relative to the outer clutch member.

* * * * *